US009186868B2

(12) United States Patent
Moore et al.

(10) Patent No.: US 9,186,868 B2
(45) Date of Patent: Nov. 17, 2015

(54) LAMINATE PANELS PRODUCED FROM BIOPOLYMERS

(75) Inventors: Charles H. Moore, Salt Lake City, UT (US); John E. C. Willham, Sandy, UT (US)

(73) Assignee: 3form, LLC, Salt Lake City, UT (US)

( * ) Notice: Subject to any disclaimer, the term of this patent is extended or adjusted under 35 U.S.C. 154(b) by 344 days.

(21) Appl. No.: 13/609,073

(22) Filed: Sep. 10, 2012

(65) Prior Publication Data

US 2014/0072732 A1 Mar. 13, 2014

Related U.S. Application Data

(63) Continuation of application No. PCT/US2011/028524, filed on Mar. 15, 2011.

(60) Provisional application No. 61/314,470, filed on Mar. 16, 2010.

(51) Int. Cl.
*B32B 9/02* (2006.01)
*B32B 23/20* (2006.01)
(Continued)

(52) U.S. Cl.
CPC . *B32B 9/02* (2013.01); *B32B 5/024* (2013.01); *B32B 9/045* (2013.01); *B32B 23/08* (2013.01); *B32B 23/20* (2013.01); *B32B 27/08* (2013.01); *B32B 27/12* (2013.01); *B32B 27/308* (2013.01); *B32B 27/36* (2013.01); *B32B 37/06* (2013.01); *B32B 37/085* (2013.01); *E04F 15/105* (2013.01); *E04F 15/107* (2013.01); *B29K 2995/0056* (2013.01); *B32B 2307/3065* (2013.01); *B32B 2307/558* (2013.01); *B32B 2307/7163* (2013.01); *B32B 2419/00* (2013.01); *Y10T 428/24967* (2015.01); *Y10T 428/3179* (2015.04); *Y10T 428/31786* (2015.04); *Y10T 428/31971* (2015.04); *Y10T 428/31986* (2015.04)

(58) Field of Classification Search
None
See application file for complete search history.

(56) References Cited

U.S. PATENT DOCUMENTS 5,910,350 A 6/1999 Loracks
2002/0065345 A1 5/2002 Narita
(Continued)

OTHER PUBLICATIONS

Geeta Mehta et al., Journal of Polymers and the Environment vol. 13(2), 2005, pp. 169-175.
(Continued)

*Primary Examiner* — Ramsey Zacharia
(74) *Attorney, Agent, or Firm* — Workman Nydegger (57) ABSTRACT

A method for manufacturing the biopolymer panel may include positioning a plurality of biopolymer sheets adjacent to one another, and subjecting them to a laminating temperature that exceeds the glass-transition temperature of the sheets for a time period sufficient to achieve lamination. The laminate panel is then quenched at a quenching temperature that is below the glass-transition temperature. The time period during lamination, as well as any "rest" period between lamination and quenching, is sufficiently short so as to prevent clouding or hazing as a result of crystallization of the biopolymer resin materials. In addition, the panel exhibits sufficient flame retardancy to meet applicable building codes, exhibits sufficient impact resistance for use as a decorative or structural panel building material, and exhibits no substantial thermally induced degradation as a result of subjection to the laminating temperature. The panels may be used as decorative or structural building materials.

24 Claims, 6 Drawing Sheets

(51) Int. Cl.
- *B32B 27/08* (2006.01)
- *B32B 27/36* (2006.01)
- *B32B 23/08* (2006.01)
- *B32B 5/02* (2006.01)
- *B32B 9/04* (2006.01)
- *B32B 27/12* (2006.01)
- *B32B 27/30* (2006.01)
- *B32B 37/06* (2006.01)
- *B32B 37/00* (2006.01)
- *E04F 15/10* (2006.01)

(56) References Cited

U.S. PATENT DOCUMENTS

| | | |
|---|---|---|
| 2003/0039775 A1 | 2/2003 | Kong |
| 2005/0147799 A1 | 7/2005 | Bordener |
| 2006/0046034 A1* | 3/2006 | Schober .................. 428/195.1 |
| 2006/0286373 A1 | 12/2006 | Egawa |

OTHER PUBLICATIONS

International Search Report and Opinion for 15999.81a mailed Nov. 24, 2001.

* cited by examiner

| Sample 1 | Resin Type | Biomer PLLA L9000 |
| --- | --- | --- |
| | Gauge | 0.030" |
| | Size | 8" x 10" |
| | Interlayer | Solo white, sandstone surface finishes |
| Hot Press | Temperature | 245 F |
| | Pressure | 54 psi (4000 psi Hydraulic Line Pressure) |
| | Time | 11 minutes |
| Cold Press | Temperature | 56 F |
| | Pressure | 54 psi (4000 psi Hydraulic Line Pressure) |
| | Time | 11 minutes |

*Fig 5A*

| Sample 1A (rerun of 1) | Resin Type | Biomer PLLA L9000 |
| --- | --- | --- |
| | Gauge | 0.030" |
| | Size | 8" x 10" |
| | Interlayer | Solo white, sandstone surface finishes |
| Hot Press | Temperature | 230 F |
| | Pressure | 54 psi (4000 psi Hydraulic Line Pressure) |
| | Time | 11 min. |
| Cold Press | Temperature | 55 F |
| | Pressure | 54 psi (4000 psi Hydraulic Line Pressure) |
| | Time | 11 min. |

*Fig 5B*

| Sample 2 | Resin Type | Spartech Rejuven8 (99% Natureworks PLA) |
| --- | --- | --- |
| | Gauge | 0.030" |
| | Size | 10" x 10" |
| | Interlayer | Noir linen (coarse black fabric), patent finishes |
| Hot Press | Temperature | 225 F (top platen), 219 F (bottom platen) |
| | Pressure | 54 psi (4000 psi Hydraulic Line Pressure) |
| | Time | 6 min. |
| Cold Press | Temperature | 58 F |
| | Pressure | 54 psi (4000 psi Hydraulic Line Pressure) |
| | Time | 6 min. |

*Fig 5C*

| | | |
|---|---|---|
| Sample 3 | Resin Type | Spartech Rejuven8 (99% Natureworks PLA) |
| | Gauge | 0.030" |
| | Size | 10" x 10" |
| | Interlayer | Drift blue interlayer, sandstone/supermatte finishes |
| Hot Press | Temperature | 265 F |
| | Pressure | 54 psi (4000 psi Hydraulic Line Pressure) |
| | Time | 11 min. |
| Cold Press | Temperature | 58F |
| | Pressure | 54 psi (4000 psi Hydraulic Line Pressure) |
| | Time | 11 min. |

*Fig 6A*

| | | |
|---|---|---|
| Sample 4 | Resin Type | Spartech Cellulose Acetate (bluish hue color) |
| | Gauge | 0.030" |
| | Size | 12" x 12" |
| | Interlayer | Drift brown interlayer, patent/supermatte finishes |
| Hot Press | Temperature | 265 F |
| | Pressure | 54 psi (4000 psi Hydraulic Line Pressure) |
| | Time | 11 min. |
| Cold Press | Temperature | 58F |
| | Pressure | 54 psi (4000 psi Hydraulic Line Pressure) |
| | Time | 11 min. |

*Fig 6B*

LAMINATE PANELS PRODUCED FROM BIOPOLYMERS

CROSS-REFERENCE TO RELATED APPLICATIONS

The present invention is a continuation of PCT Patent Application No. PCT/US11/28524, filed Mar. 15, 2011, which claims the benefit of priority to U.S. Provisional Application No. 61/314,470, filed Mar. 16, 2010. The entire content of each of the aforementioned applications is incorporated by reference herein.

BACKGROUND OF THE INVENTION

1. Field of the Invention

The present invention relates to systems, methods, and apparatus for creating laminate structures produced from bio-based polymer materials.

2. Background and Relevant Art

Recent architectural designs often include synthetic polymeric resin panels, which may be used as partitions, displays, barriers, lighting diffusers or decorative finishes etc. These polymeric panels are typically constructed using poly vinyl chloride (PVC), polyacrylate materials such as poly methyl-methacrylate (PMMA), polyester materials such as polyethylene terephthalate (PET), poly ethylene-co-cyclohexane 1,4-dimethanol terephthalate (PETG) modified with 1,4-cyclohexanedimethanol (CHDM), glycol modified polycyclohexylenedimethylene terephthalate (PCTG), or polycarbonate (PC) materials and the like. Such synthetic polymeric resin materials are derived from byproducts of petroleum processing.

In general, such petroleum based resin panels have become popular with architects and designers as compared to decorative cast or laminated glass materials, since the polymeric resin materials may be manufactured to be more resilient, but to provide a similar transparent, translucent, and/or colored appearance as cast or laminated glass, at lower cost. Decorative resin panels may also provide greater design flexibility as compared to glass in terms of color, texture, gauge, and impact resistance. Furthermore, decorative resin panels have a fairly wide utility since they may be easily and inexpensively formed and fabricated to include a large variety of artistic colors, images, shapes, structures and assemblies.

In particular, resin panels can be economically produced in flat or three-dimensional (i.e., curved or other-shaped) forms, such as with compound curvatures. As a result, such polymer resin panel materials provide relatively wide functional and aesthetic utility, and can be used to easily change the design or function of new or existing structures. Once their useful life is over, such panels are typically disposed of within a landfill, as such large panels are not easily incorporated into existing recycle streams. Unfortunately, such panels are formed of petroleum-derived resins and are typically sent to a landfill when the product or application is no longer of use or needed. Thus, although such polymeric resin materials may be recycled, they are often simply disposed of within a landfill where they do not readily decompose or otherwise degrade and break down. As a result, there is a desire to use resin-based materials that would provide the performance benefits (e.g., impact resistance, low cost, flexibility in color, gauge, and texture) associated with petroleum derived polymeric resins but that would also be biodegradable or compostable at the end of the given material's useful life.

Along these lines, biopolymers represent a unique and responsible option for use as building materials because they are able to be composted, or are biodegradable upon disposal. Biopolymers derived from natural renewable plant or microorganism materials include polysaccharides (e.g., starch, cellulose), polyesters (e.g., polyhydroxyalconates (PHA), poly-3-hydroxybutyrate (PHB)), as well as polyesters synthesized from bio-derived monomers (e.g., polylactic acid (PLA)). Of these biopolymer materials mentioned, at least PHA, PHB, PLA, and blends thereof are compostable or biodegradable.

As used herein, the terms "biopolymer" and "bio-based polymer" refer to polymers produced or derived from living organisms or products of living organisms. For example, they may be produced from biomass. Such biopolymers are biodegradable (e.g., degradable to $CO_2$ and water through the biological processes of microorganisms), and many are compostable (e.g., they may be inserted into an industrial composting process within which they will break down by about 90% in six months).

In contrast, conventional polymers used as building materials are typically produced from petroleum derivatives. Thus, not only do petroleum-based resins degrade very slowly (e.g., often on the order of tens or hundreds of thousands of years), but the basis for such conventional resins (i.e., petroleum), is non-replenishing and continually under pressure of exhaustion and market instability. Not surprisingly, therefore, it is increasingly important among manufacturers to consider not only the ramifications of material disposal, but also the source of the resins employed to manufacture such polymeric panels.

Of course, one will appreciate that biopolymers degrade more rapidly than petroleum-based resins and therefore can often be composted, rather than sent to a landfill. However, degradation is diametrically opposed to the notion that the best building materials resist degradation as they are required to be structurally stable. In general, biopolymer resins can be as structurally sound and long-lasting as petroleum-based resin materials, so long as the biopolymer resins are not subjected to degradation triggers. In general, these degradation triggers may include certain combinations of temperature, moisture content, biological activity and pressure over some time interval. Polymeric resin panels are often configured as a plurality of resin sheets that have been thermally fused together. Biopolymer resins are thought to be incompatible with thermal fusion processes (e.g., lamination of panels), since conventional temperatures and pressures employed are likely to initiate or accelerate degradation processes.

Another problem with subjecting biopolymer resins to thermal fusion processes is that most biopolymer resin materials are or are more likely to assume a crystalline or semi-crystalline structure, rather than an amorphous structure. Because biopolymer resins are more likely than amorphous petroleum-based resins to assume a crystalline structure, they tend to shift from transparent or semi-transparent to opaque when subjected to conventional temperatures and pressures associated with typical thermal fusion processes. This shift in transparency is believed to be a result of process-induced crystallization. For at least these additional reasons, therefore, biopolymer resins are also thought to be incompatible with the manufacture of high-end decorative and structural laminate panels, where a high degree of optical clarity, aesthetics, long term performance, and functionality are desired.

Today, the use of biopolymer materials is largely limited to packaging applications. Biopolymers are of particular use as disposable food and other product packaging materials due to their moldability and their biodegradable and/or compostable characteristics. Such packaging applications are primarily directed to single-use or short shelf-life products (e.g., food containers and the like) and the packaging material is typically discarded after a short time. Because of the short shelf-life of such products, the rapid degradability of such biopolymers has not been an issue.

Biopolymers are rarely produced in thicknesses greater than about 0.04 inch, as there is little or no demand for thicker materials. In addition to lack of commercial demand for thick gauge biopolymer sheet materials, it is well known that extrusion of easily crystallizable materials becomes increasingly difficult as the thickness of the sheet increases. Hence, there tends to be a practical processing limitation on the thickness of such biopolymer-based sheet products so as to prevent crystallization. Attempts to form thicker sheets may induce crystallization, which destroys the transparent or translucent characteristics of the material. Crystallization also dramatically decreases tensile strength and impact strength. This presents a major challenge to the use of biopolymers as building materials, because polymeric materials having a thickness of about 0.06 inch or less are of little use in architectural applications where some degree of structural integrity are required.

Finally, there are specific requirements for structural and flammability performance, as described in the International Building Code (IBC), that polymeric materials must conform to in order to be used as building materials. Currently available biopolymer polymeric sheet materials do not meet these performance criteria established in the IBC. Hence, the demand for a material that would meet the various needs of architectural applications that is also more environmentally friendly has not yet been met, for a variety of reasons.

BRIEF SUMMARY OF THE INVENTION

Implementations of the present invention provide bio-based polymer panels as well as related methods of manufacture. Such panels provide excellent aesthetics, including optical clarity. According to one embodiment, the panel comprises a first biopolymer resin sheet, and a second biopolymer resin sheet, wherein the sheets are laminated together to form a single, unitary panel. Each laminated resin sheet is substantially transparent or translucent so as to exhibit substantially no clouding within the resin sheets. In one embodiment, the panel may include any number or type of interlayer materials or finishes. Examples of such interlayers or finishes include fabrics, botanical structures (e.g., real or faux plant-like interlayers), metals or films (colored or imaged), each of which contribute positively to one or both of the aesthetic or structural characteristics of the panel.

According to a related method of manufacture, a plurality of biopolymer resin sheets are positioned adjacent to one another to form a pre-laminate assembly, and the assembly is subjected to a laminating temperature between a glass transition temperature and a melting temperature of the biopolymer resin so as to soften the biopolymer resin material of each sheet, allowing chain entanglement between the adjacent sheets resulting in a unitary laminated panel. The unitary laminated panel is then quenched by subjection to a quenching temperature that is well below the glass-transition temperature of the biopolymer resin. The time period between subjection to the laminating temperature and subjection to the quenching temperature is sufficiently short (e.g., preferably less than about 20 minutes) to prevent clouding of the biopolymer such that the resin sheets remain substantially transparent or translucent following processing.

The laminate panels are sufficiently rigid, stable, and strong for use as building materials over virtually any desired length of time (e.g., years or decades). The lamination process advantageously does not result in the onset of crystallization of the resin materials, which would reduce optical clarity, as well as strength. The lamination of multiple sheets of biopolymers (e.g., achieving a thickness of at least about 0.15 inch) results in improved flammability and impact performance, resulting in a panel which meets building code requirements relative to flammability and impact resistance. Such panels are advantageously formed from renewable materials, are biodegradable upon disposal, or may be composted at the end of their useful life.

For example, laminate panels in accordance with at least one implementation of the present invention can be processed with appropriate temperatures and pressures, over particularly selected appropriate time intervals, which do not trigger crystallization or degradation mechanisms. Application of appropriate temperatures and pressures for laminating and/or quenching may be by heat and/or pressure rollers, heat and/or pressure flat presses (e.g., batch or semi-batch), or autoclaving (i.e., heat in combination with pressure or vacuum). In any case, exposure times to the laminating temperature are sufficiently short (e.g., as a result of quenching) so as to not trigger degradation of the panels and to avoid any substantial crystallization, which would result in clouding and loss of optical clarity.

Additional features and advantages of exemplary implementations of the present invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present disclosure encompasses bio-based polymer laminate panels and related methods of manufacture. According to one embodiment, a laminate panel includes a first biopolymer resin sheet comprising a biopolymer resin, a second biopolymer sheet comprising a biopolymer resin material, both of which sheets are not derived from petroleum-based products. The sheets are laminated together to form a single unitary panel and each of the laminated sheets of the unitary panel are substantially transparent or translucent so as to exhibit substantially no clouding within the resin sheets. The panel structures provide a high degree of aesthetics, including optical clarity within the biopolymer resin sheets, and can be made with any number or type of interlayer materials or surface finishes.

According to a related method of manufacture, the first and second biopolymer resin sheets are positioned adjacent to one another (optionally with a decorative interlayer between) in a pre-laminate assembly, which is subjected to a laminating temperature that is between the glass-transition temperature and the melting temperature of the biopolymer resin material. Subjection to heat causes the biopolymer resin material of the sheets to soften, laminating the initially separate sheets together to form a unitary laminated panel. After lamination, the unitary laminated panel is quenched by subjection to a quenching temperature that is lower than the laminating temperature. The quenching temperature is lower than the glass-transition temperature. Quenching of the laminated panel rather than simply allowing the panel to cool at ambient conditions quickly cools the biopolymer material so as to prevent any substantial onset of crystallization, which would otherwise result in clouding and loss or at least reduction of optical clarity within the biopolymer sheets. As a result, the optical clarity, including the translucent or transparent characteristics of the biopolymer sheet prior to lamination, are maintained so that substantially no reduction of optical clarity results.

In addition, the lamination of multiple relatively thin biopolymer sheets (e.g., about 0.03 inch thickness) into a significantly thicker laminate panel (e.g., at least about 0.15 inch thickness) significantly improves the flammability resistance rating and impact resistance (i.e., toughness) of the laminate panel as compared to individual thin biopolymer sheets. The increased strength and flammability resistance allow the laminate panel to meet building code requirements for use of the panel as a replacement for petroleum-based polymeric panels. Furthermore, laminate panels constructed in accordance with implementations of the present invention maintain the desirable characteristics associated with biopolymer materials with respect to their renewable source, as well as ability to biodegrade and/or be composted at the end of their useful life.

II. Exemplary Bio-Based Polymer Panels and Methods of Manufacture

Specifically, and as will be understood more fully herein, implementations of the present invention relate to polymeric panel structures (or "biopolymer panels," or "panels") that are advantageously manufactured from organic biopolymer resins derived from renewable plant or animal sources, rather than from petroleum based sources. In general, biopolymer-based panels offer "green" building benefits over similar petroleum-based plastic panel constructs due to the fact that the feedstock materials are renewable and the product can be biodegraded and/or composted at the end of the useful life of the product. Just as with petroleum-based plastic materials, the panel structures made with biopolymer resins can be manufactured with decorative surface finishes or may include embedded or encased decorative interlayers that provide various performance benefits (e.g., aesthetics, light diffusion, coloring, etc.) as dictated by the particular architectural design or building application.

Figure 1A:
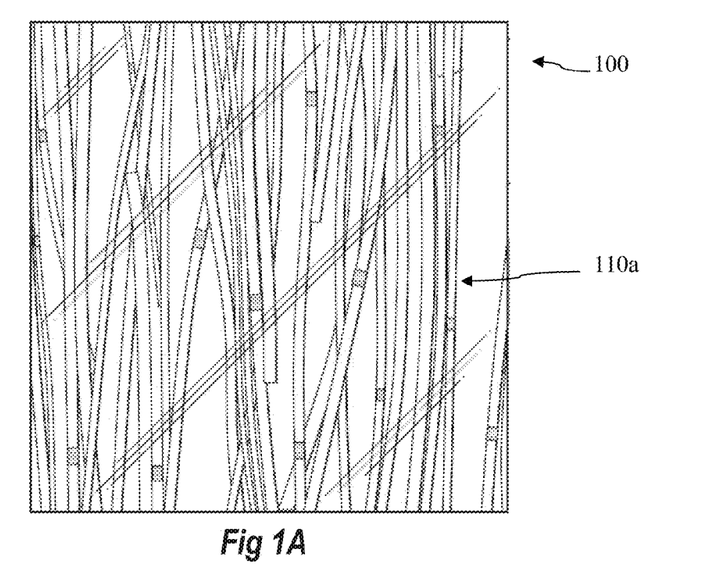
FIGS. 1A-1B illustrate various exemplary laminate panels that can be made with one or more biopolymer resin sheets and one or more decorative interlayers, such as those that comprise organic, botanical materials.
Figure 1B:
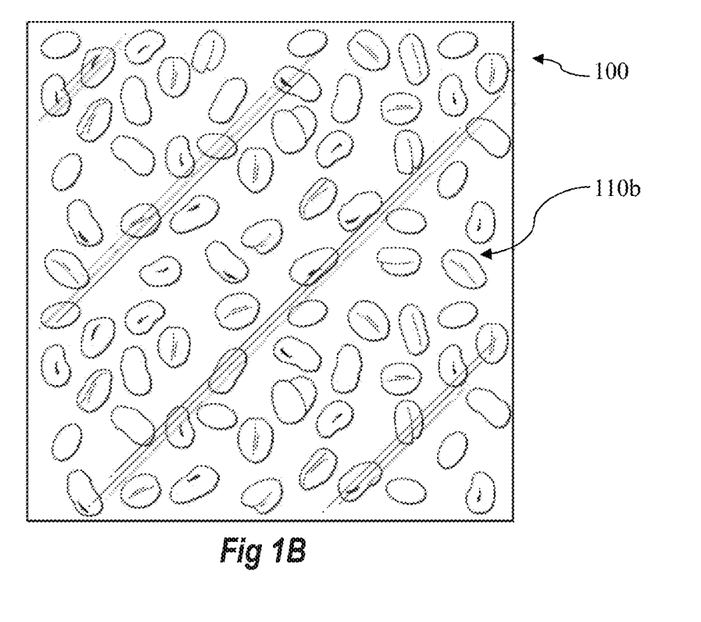

FIGS. 1A and 1B illustrate exemplary laminate panels 100 that can be manufactured in accordance with implementations of the present invention. In particular, FIG. 1A illustrates a biopolymer laminate panel 100 that has been manufactured with a plurality of decorative objects 110a in the form of thatch reed. Thatch reed 110a may comprise an interlayer embedded between layers of biopolymer resin sheets. In contrast, FIG. 1B illustrates another biopolymer laminate panel 100 that has been manufactured with a plurality of decorative objects 110b in the form of coffee beans. Coffee beans 110b may similarly be embedded between layers of biopolymer resin sheets. In either case, the portion of laminate panels 100 that comprise the biopolymer resin material are substantially translucent or substantially transparent, and portray the aesthetic characteristics of the corresponding interlayer 110a or 110b embedded therein. The biopolymer portions of panels 100 may be manufactured according to the processes of the present invention so as to maintain a relatively high degree of optical clarity (i.e., substantially no added crystallization, clouding, or bubble entrapment) in the final panel 100 while also meeting performance criteria required for building product applications.

Figure 2A:
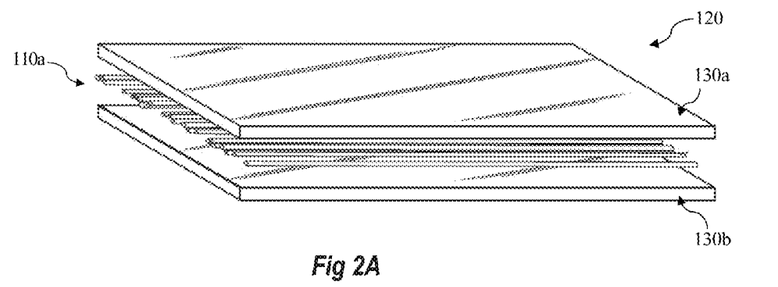
FIG. 2A illustrates a prepared layup assembly in a pre-laminated condition including a decorative interlayer to be sandwiched between two biopolymer resin sheets which become thermally fused together upon application of heat and pressure to result in the structure shown in FIG. 1A.

FIG. 2A illustrates a prepared layup assembly 120 prior to lamination of the biopolymer sheets 130a and 130b with decorative interlayer 110a of thatch reed sandwiched therebetween. Upon lamination of the individual separate biopolymer sheets 130a and 130b, a unitary laminate panel 100 (e.g., as shown in FIG. 1A) is formed. A decorative surface finish may be applied during or after lamination as will be apparent to one of skill in the art.

Figure 2B:
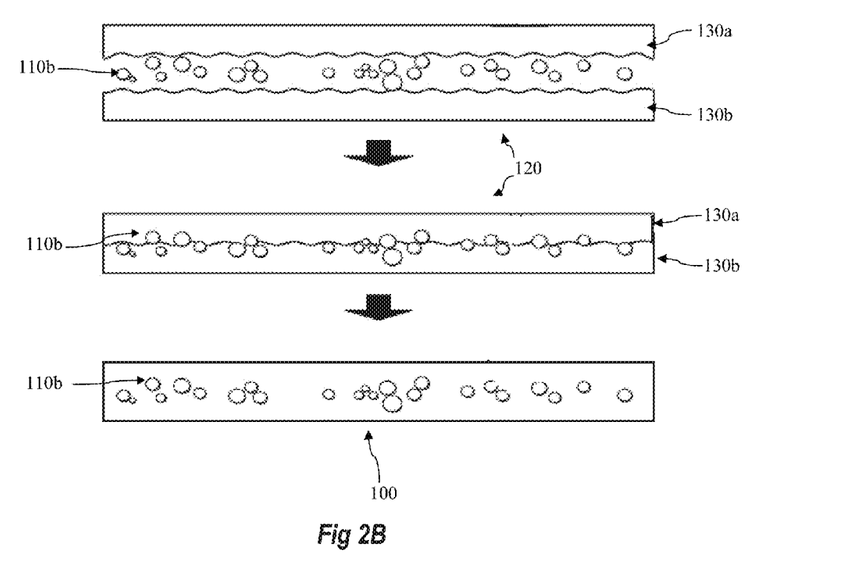
FIG. 2B illustrates a sequence in which a prepared layup assembly is exposed to a laminating temperature and pressure in order to thermally fuse a decorative interlayer between two biopolymer resin sheets so as to result in the structure shown in FIG. 1B.

FIG. 2B illustrates a side view a sequential progression during manufacture of panel 100 of FIG. 1B. For example, to create a decorative laminate panel, such as shown in FIGS. 1A and 1B, the manufacturer may position one or more decorative objects (e.g., coffee beans 110b) an interlayer between the biopolymer resin sheets 130a and 130b to create a pre-laminate laminate assembly 120. Of course, one will appreciate that a manufacturer may include more than just the two biopolymer resin sheets 130a and 130b illustrated, and that as desired, additional or alternative decorative objects may be sandwiched or embedded.

In such cases, the additional biopolymer resin sheets (e.g., see FIG. 4) and/or additional or alternative decorative object layers (not shown) can provide additional structural rigidity, thickness, or add different aesthetic characteristics. For example, the manufacturer may include one laminate assembly 120 having thatch reed 110a sandwiched therein, and further include another assembly comprising a textile image layer and an additional biopolymer resin sheet. Upon subjecting the one or more assemblies to a lamination process as described below (e.g., see FIGS. 5A-6B), the resulting laminate panel will include aesthetic characteristics provided by the two or more decorative image layers (i.e., the combined aesthetics provided by a thatch reed interlayer and a textile image interlayer).

FIG. 2B illustrates the sequential progression as an exemplary pre-laminate assembly 120 is subjected to an appropriate lamination temperature and pressure, e.g., as shown in FIGS. 5A-6B. As the pre-laminate assembly 120 is subjected to a laminating temperature and pressure is simultaneously applied, the biopolymer resin sheets 130a and 130b begin to soften, as shown in FIG. 2B. As sheets 130a and 130b soften, decorative objects 110b become embedded between and within the softened sheets until they may be fully encased as shown in FIG. 2B. Once any decorative layer or object has been embedded as desired and the biopolymer resin sheets have thermally fused to one another, the unitary laminated panel is then quenched by subjecting the panel to a quenching temperature that is significantly colder than the laminating temperature. Quenching of the panel quickly cools the panel to prevent any significant growth of crystals within the biopolymer material, which reduces strength, toughness, and optical clarity (i.e., it leads to clouding). For example, the final sequence of FIG. 2B shows the cross-section of the panel 100 once quenching is complete, and the thermoforming process has resulted in a substantially unitary laminated panel 100.

Figure 3A:
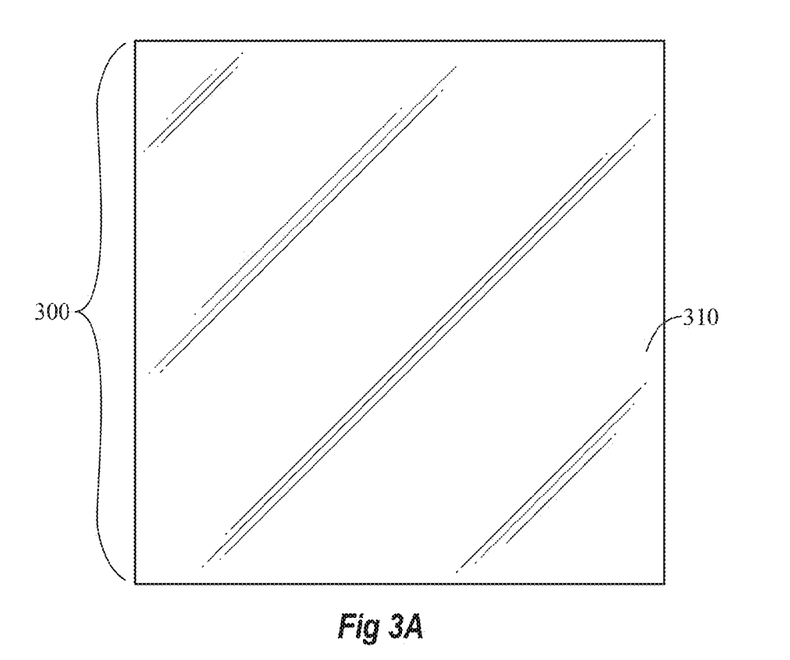
FIGS. 3A-3B illustrate top and side views respectively, of an exemplary laminate panel that can be made from a plurality of biopolymer resin sheets and including a decorative finish.
Figure 3B:
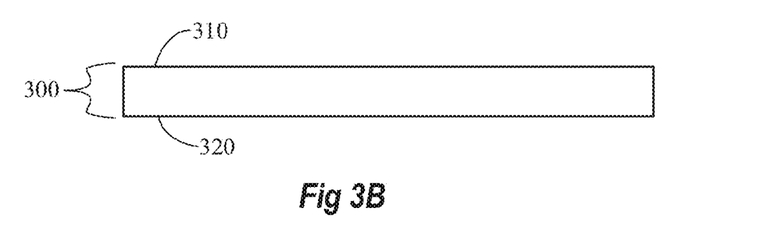

FIGS. 3A-3B illustrate a biopolymer laminate panel 300 that has been prepared in conjunction with a plurality (e.g., two or more) of similar biopolymer sheet substrates with no interlayer, but where the outermost surfaces 310 and 320 have been enhanced with texturing layers 310, 320 that impart a decorative (e.g., a light diffusing) surface finish. It should be recognized that surface finishes 310 and 320 may represent the same finish or may represent two different finishes applied to front and back surfaces of the panel 300.

Figure 4:
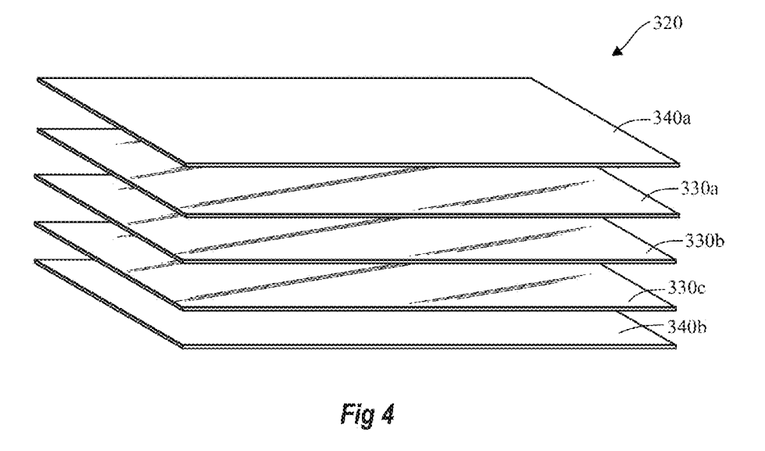
FIG. 4 illustrates a prepared layup assembly in a pre-laminated condition which upon subjection to a laminating temperature and pressure followed by subjection to a quenching temperature and pressure forms the unitary laminate panel shown in FIGS. 3A-3B.

FIG. 4 illustrates a pre-laminate assembly 320 for manufacturing the decorative biopolymer laminate structure 300 shown in FIGS. 3A-3B. As shown, biopolymer pre-laminate assembly 320 may include a plurality of biopolymer resin layers or substrates 330a, 330b, and 330c, each of which may comprise a biopolymer resin material. To provide the panel with a decorative surface finish such as shown in FIGS. 3A and 3B, surface finish plates 340a and 340b may be disposed at the top and bottom of the assembly 320. As shown, surface finish plates 340a and 340b may include texturing, which imparts a textured or embossed surface finish into the outer surfaces of the finished unitary laminated panel 300 that are a negative of the texturing of finish plates 340a and 340b once biopolymer resin sheets 330a, 330b, and 330c are subjected to appropriate laminating temperatures and pressures. Alternatively, the surface finish plates 340a and 340b may comprise die layers that impart an image or color into the biopolymer resin sheets 330a and 330c upon application of laminating heat and pressure. Still further, the surface finish plates 340a and 340b may comprise a colored film which fuses to the biopolymer resin sheets 330a and 330c upon the application of laminating heat and pressure.

Of course, one will appreciate that any desired number of biopolymer sheets may be included, that combinations of or alternative decorative objects and/or surface finishes may be provided, and that one or more adhesive layers, such as a thermoplastic tie layer, may be provided between one or more of the biopolymer resin sheets 330a, 330b, and 330c depending upon the desired configuration of biopolymer laminate panel 300.

Furthermore, according to one embodiment, the texture may already be present within a biopolymer sheet (e.g., applied as described above with a texturing plate to a softened biopolymer sheet) when it is positioned within the pre-laminate assembly. In such a case, a pretextured biopolymer sheet may be positioned at the interior of a pre-laminate assembly, sandwiched between adjacent sheets.

Upon subjecting the pre-lamination assembly 320 to a laminating temperature while simultaneously applying pressure, the assembly 320 will include the aesthetic characteristics of the one or more finish sheets 340a and 340b (as well as any other decorative objects, interlayers, or surface finishes employed) and form a unitary laminate panel 300 with a thickness substantially equal to the combined thickness of the biopolymer resin sheets thermally fused together to form the panel. For example, upon subjection of the pre-laminate assembly 320 to a laminating temperature over an appropriate time period, the biopolymer resin sheets 330a, 330b, and 330c begin to soften and fuse together. Additionally, as the outer faces of sheets 330a and 330c soften they allow the finish sheets 340a and 340b to impart the desired surface finish to the biopolymer resin sheets 330a and 330c. Once thermally fused, the unitary laminated panel is quenched by subjecting the laminated panel to a significantly colder quenching temperature, which prevents any substantial growth of crystals within the biopolymer materials, which otherwise result in clouding and loss of optical clarity within the biopolymer materials.

The biopolymer resin sheet substrates may comprise any suitable biopolymer derived from living organisms or products of living organisms. Examples of such materials include, but are not limited to, polyhydroxyalkonates (PHA), polylactic acid (PLA), poly-3-hydroxybutyrate (PHB), poly-trimethylene terephthalate (PTT), cellulose, or starch-derived biopolymeric materials such as cellulose acetate, cellulose acetate butyrate, cellulose acetate propionate, or copolymers thereof. Another example of a biodegradable biopolymer material is polyvinyl alcohol (PVA). Information relative to glass-transition temperature, melting points, and crystallization temperatures for selected biopolymers is in Table I, below. In one embodiment, all of the biopolymer sheets may be of the same material. In another embodiment, one of the biopolymer sheets may comprise a material that is different from another biopolymer sheet. Where different sheet materials are used, preferably the glass-transition temperatures of the different materials are similar to one another. Other suitable biopolymers will be apparent to those of skill in the art.

TABLE I

Temperature Characteristics of Various BioPolymers

| BioPolymer | Glass-Transition Temperature (° F.) | Melting Point (° F.) | Crystallization Temperature (° F.) |
|---|---|---|---|
| PLA | 136-150 | 300-320 | 212-248 |
| PHB | 32 | 284-356 | N/A |
| PVA | 158 | 360-446 | N/A |
| Cellulose Acetate | 150-155 | 240 | N/A |

In one implementation, the laminating temperature applied during lamination of the plurality of biopolymer resin sheets to one another is between the glass-transition temperature and the melting temperature of the biopolymer resin material. Preferably, the laminating temperature is at least about 50° F. above the glass-transition temperature, more preferably at least about 75° F. above the glass-transition temperature, and most preferably at least about 110° F. above the glass-transition temperature. In one embodiment, the laminating temperature is not more than about 200° above the glass-transition temperature. For example, the laminating temperature may between about 50° F. and about 200° F. above the glass-transition temperature, more preferably between about 75° F. and about 175° F. above the glass-transition temperature, and most preferably between about 110° F. and about 150° F. above the glass-transition temperature.

As shown in Table I, crystallization temperature data is often not readily available for many biopolymer materials. In one embodiment, the laminating temperature is selected so as to be below the crystallization temperature of the particular biopolymer being processed. It some embodiments, it may be possible to laminate at temperatures within the crystallization range of the biopolymer so long as the laminating time is sufficiently short and the material is quickly quenched to below the crystallization temperature.

The glass-transition temperatures of PLA and cellulose acetate, two materials tested in working examples of the present inventive embodiments, are similar to one another. For example, the glass-transition temperature of PLA (specifically a PLLA such as BIOMER PLLA L9000) is between about 140° F. and about 150° F. The glass-transition temperature of cellulose acetate (e.g., specifically SPARTECH cellulose acetate) is between about 150° F. and about 155° F. When laminating such materials, the inventors have found that a laminating temperature between about 215° F. and about 280° F. works well. A preferred laminating temperature, which works particularly well for such materials is between about 250° F. and about 280° F. (e.g., about 265° F.), which results in complete or nearly complete thermal fusion of the individual biopolymer sheets so that delamination is not readily possible. Such a laminating temperature is about 110° F. to about 125° F. above the glass-transition temperature of the biopolymer materials.

In one implementation, the quenching temperature applied after lamination in order to quickly cool the laminate panel and prevent hazing or clouding as a result of crystallization is below the glass-transition temperature of the biopolymer material. Preferably, the quenching temperature may be between about 50° F. and about 150° F. below the glass-transition temperature. More preferably, the quenching temperature may be between about 60° F. and about 140° F. below the glass-transition temperature. Most preferably, the quenching temperature may be between about 75° F. and about 100° F. below the glass-transition temperature. For example, in the case of PLA and cellulose acetate (which have similar glass-transition temperatures), the inventors have found that a quenching temperature between about 50° F. and about 60° F. works well. A preferred quenching temperature for such materials is between about 55° F. and about 60° F. In ambient temperature conditions, particularly during summer, the quenching apparatus (e.g., a cold press) may require active cooling in order to keep it cooler than the ambient temperature (which is often between about 65° F. and about 75° F.). Various suitable configurations for such a cold press will be apparent to one of skill in the art.

For biomaterials exhibiting glass-transition temperatures below ambient temperatures, the quenching temperature may be somewhat higher. For example, PHB has a glass-transition temperature of about 32° F. A suitable quenching temperature for such biomaterials may be at or near the glass-transition temperature.

The laminating sequence and/or the quenching sequence may typically also be accompanied by the application of pressure. Typical pressures applied may range between about 25 psi and about 200 psi, more typically between about 25 psi and about 100 psi, and still more typically between about 40 psi and about 60 psi.

The time period associated with the laminating sequence may depend on several factors, including the actual laminating temperature (e.g., with higher temperatures, less time may be required to achieve lamination) and the thickness of the pre-laminate assembly (i.e., longer times may be required for thicker assemblies). Generally, the time period spent within the lamination apparatus may be between about 3 minutes and about 25 minutes, more preferably between about 5 minutes and about 20 minutes, and most preferably between about 10 minutes and about 15 minutes. In one implementation, the time period is not more than about 15 minutes. The time period associated with quenching may also depend on several factors, including the laminating temperature employed, the quenching temperature employed, the thickness of the pre-laminate assembly, etc. Typically, the quenching times may be similar to the lamination times. In one embodiment, the lamination time period and quenching time period may be substantially equal to one another.

Figure 5A:
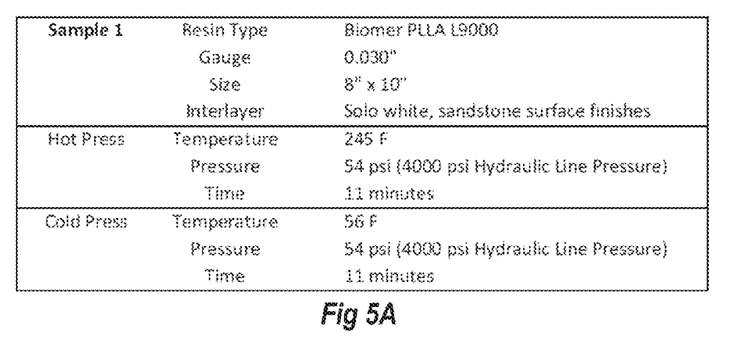
FIGS. 5A-5C show tables including information relative to various examples that were tested for manufacture of biopolymer laminate panels.
Figure 5B:
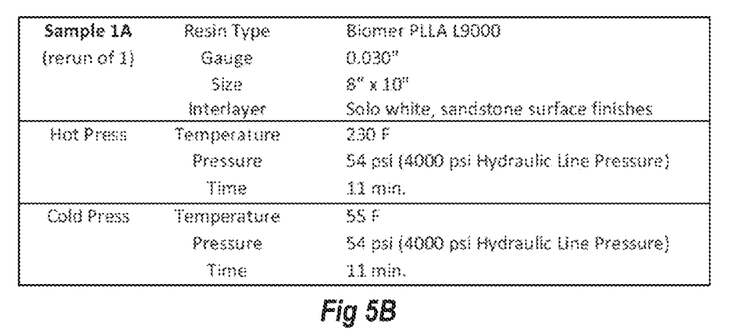
Figure 5C:
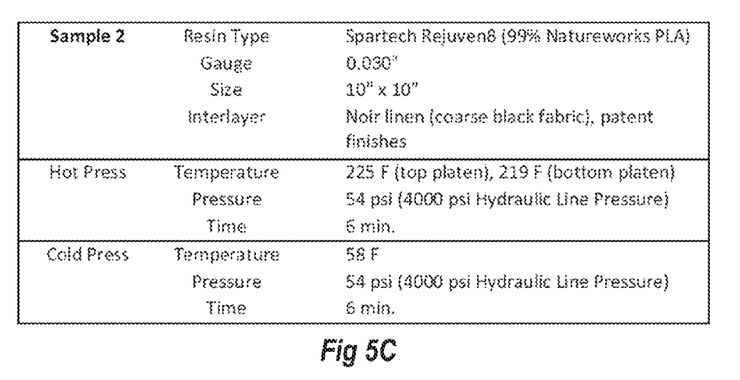

FIGS. 5A through 5C show processing information relative to various examples that were tested according to the present invention. As recorded in FIG. 5A, sample 1 was prepared with the biopolymer BIOMER PLLA L9000, a polylactic acid biopolymer. Biopolymer sheets having a thickness of about 0.03 inch and a size of about 8 inches by about 10 inches were positioned with a SOLO WHITE interlayer and prepared for lamination. SOLO White is a woven fabric material. Finishing plates with a sandstone surface finish were also positioned to provide the outer faces of the biopolymer sheets with the desired surface finish upon processing. The pre-laminate assembly was placed within the hot press and subjected to a laminating temperature of about 245° F. and a pressure of about 54 psi for a period of 11 minutes, which resulted in softening of the biopolymer sheets and thermal fusion of the sheets together, providing a unitary laminated panel. After the 11 minute lamination time period, the unitary laminated panel was immediately placed within a cold press and subjected to a quenching temperature of about 56° F. and a pressure of about 54 psi, also for a period of 11 minutes. Once removed from the cold press, the biopolymer resin portions of the panel were observed to have approximately equal optical clarity as compared to the biopolymer sheets prior to processing.

In other words, there was no substantial clouding, hazing, or loss of optical clarity within the biopolymer material as a result of crystallization. In addition, no thermally induced degradation of the biopolymer was observed. Although sample 1 provided good optical clarity, it was observed that the individual biopolymer resin sheets only partially thermally fused to one another, so that one may be able to delaminate one sheet from the other.

FIG. 5B shows further processing information of the same sample 1 as in FIG. 5A, but in which it was attempted to improve thermal fusion and delamination resistance by re-laminating the same sample processed in FIG. 5A. During the repeat processing, the assembly was subjected to a laminating temperature of about 230° F. and a pressure of about 54 psi for 11 minutes, followed by quenching in the cold press for 11 minutes at 55° F. and 54 psi. Although lamination of the biopolymer sheets was observed to be better at resisting delamination as compared to sample 1 of FIG. 5A, it was still possible to separate the individual laminated biopolymer sheets from one another. As in sample 1, there was no observed crystallization clouding, hazing, or thermally induced degradation.

FIG. 5C illustrates another implementation including a different biopolymer base resin (i.e., SPARTECH REJUVEN8, a PLA biopolymer material) and with a different interlayer (i.e., NOIR LINEN, a coarse black fabric). In addition, sample 2 shown in FIG. 5C included a patent polished finish applied to the outer faces of the laminate panel. The pre-laminate assembly was subjected to a laminating temperature within a hot press in which the top platen of the press was at about 225° F. and the bottom platen of the press was at about 219° F. The laminating time was 6 minutes. After lamination, the panel was quenched in a cold press at about 58° F. for 6 minutes. Pressure applied during both lamination and quenching was 54 psi. As was the case with the examples of FIGS. 5A and 5B, the biopolymer resin sheets 130a and 130b became laminated and partially thermally fused to one another, but delamination was possible by prying the sheets apart (i.e., similar to sample 1 of FIG. 5A). There was no indication of crystallization (i.e., clouding or hazing), or panel degradation.

Figure 6A:
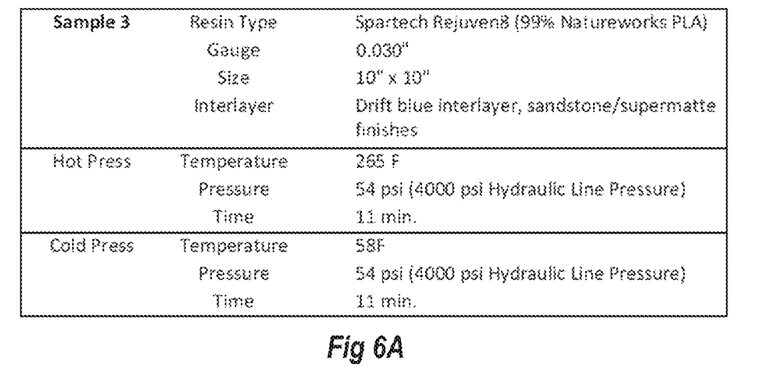
FIGS. 6A-6B show tables of including information relative to various examples that were tested for manufacture of biopolymer laminate panels exhibiting particularly good resistance to delamination of the individual biopolymer resin sheets.
Figure 6B:
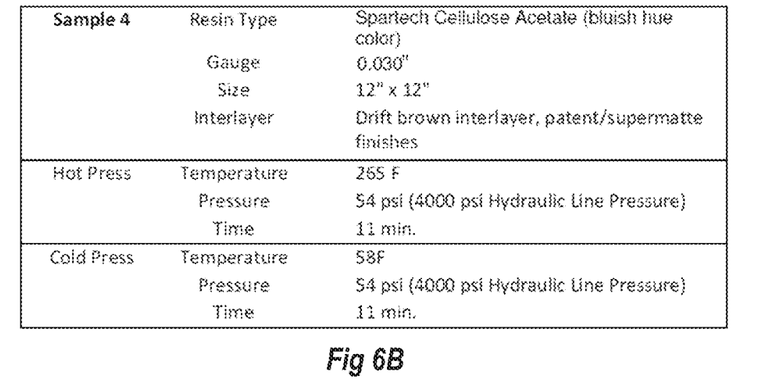

FIGS. 6A and 6B show processing information relative to samples 3 and 4. For example, sample 3, shown in FIG. 6A, used the same SPARTECH REJUVEN8 biopolymer material as sample 2 of FIG. 5C, but a different interlayer (DRIFT BLUE, a woven fabric) and a different surface finish (sandstone and supermatte textures). Lamination was for the same 11 minutes as in sample 1 of FIG. 5A, but at a significantly higher temperature, 265° F., which is about 120° F. above the glass-transition temperature of PLA. Quenching was achieved at 58° F., also for 11 minutes. In both the laminating and quenching sequences, applied pressure was 54 psi. In sample 3, the biopolymer resin sheets laminated about the decorative interlayer cleanly with no added crystallization, hazing, clouding, or panel degradation. In addition, the resulting unitary laminate panel exhibited excellent thermal fusion of the initially separate biopolymer, with no tendency towards delamination. The laminated sheets could not be pried apart without destroying the panel.

Sample 4 of FIG. 6B included SPARTECH CELLULOSE ACETATE biopolymer sheets and an interlayer of DRIFT BROWN, a woven fabric. Patent and supermatte surface finishes were applied to the outer faces of the laminate panel. The SPARTECH CELLULOSE ACETATE exhibited a translucent bluish hue, rather than being substantially clear or transparent as the biopolymer materials of samples 1-3. As with sample 3 of FIG. 6A, lamination was performed at about 265° F. over a time interval of about 11 minutes. After lamination, the unitary panel was quenched at about 58° F. for about 11 minutes. Applied pressure during both lamination and quenching was about 54 psi. As with sample 3, the resulting panel exhibited substantially complete thermal fusing of the panels, excellent bond strength to resist delamination, no signs of bubbles, clouding, hazing, or thermal degradation of the panel.

Although samples 1-4 were performed within a batch type lamination and quenching process, it will be understood that manufacture of panels according to the present invention may employ any machine capable of providing the necessary conditions (e.g., temperature, pressure, etc.). Exemplary manufacturing structures may include, but are not limited to, continuous rollers, an autoclave, etc.

One advantageous characteristic of the biopolymer laminate panels is their ability to be used as building materials for a variety of applications including, glazing, light diffusers, signage, partitioning and the like. Such building product applications are typically regulated by various building codes, such as the International Building Code (IBC). The IBC, specifically, establishes criteria for use of plastic or polymeric materials used in various building applications. Further, the IBC identifies a category of plastics as "Light-transmitting Plastics" and considers them "approved plastics" if such materials conform to combustibility classifications as specified for use in a given application. Light transmitting plastics are assessed in accordance with flame spread rates as measured in accordance with ASTM D 635 "Standard Test Method for Rate of Burning and/or Extent and Time of Burning of Plastics in a Horizontal Position".

To be considered as an approved light transmitting plastic per the IBC a biopolymer resin panel must be able to attain a burning extent per the ASTM D 635 method of 63.6 millimeters per minute or less when tested in the thickness intended for use.

To test the flammability characteristics of the biopolymer laminate panels, samples were prepared from clear SPARTECH REJUVEN8 (99% NATUREWORKS PLA) material that were 0.03 inch in thickness and ½ inch×4 inches in size and tested in accordance with ASTM D 635. The burn rate for these specimens was 75.0 mm/min; therefore such materials do not conform to the minimum burn rate criteria for light transmitting plastics as established by the IBC.

A second set of samples were prepared from clear SPARTECH REJUVEN8 (99% NATUREWORKS PLA) material, except this particular sample set was comprised of 6 layers of 0.03 inch PLA laminated in a similar manner as described above with respect to samples 1-4 of FIGS. 5A-6B. Lamination temperature was 245° F., quenching temperature was 58° F., pressure for both lamination and quenching was 55 psi, and time periods for both lamination and quenching were 11 minutes. The resulting laminated panel was about 0.16 inch in total thickness, did not crystallize and had excellent lamination integrity. The laminated panel was cut to a specimen size of ½ inch×4 inches and then fire tested in accordance with ASTM D 635 and the resulting burn rate was dramatically less, at 24.7 mm/min Data relative to the testing is recorded in Table II, below. By increasing the thickness, which is possible while retaining optical clarity and without thermal degradation through the specific method of laminating and quenching as described herein, the burn rate decreased and therefore the lamination of the thin layers resulted in a non-crystallized PLA structure that can further be classified by the IBC as an approved light-transmitting plastic.

TABLE II

PLA ASTM D 635 Burn Testing

| Sample | Seconds | Burn distance (mm) | Burn rate (mm/min) |
|---|---|---|---|
| 0.03 inch | 29 | 25 | |
| | 57 | 60 | 75 |
| 0.16 inch | 92 | 25 | |
| | 177 | 60 | 24.71 |

Often, transparent and translucent building products, such as those used for glazing applications are required to provide significant impact resistance. In this regard, a particular challenge that faces biopolymer resins, which tend to easily crystallize, is that they tend to be significantly more brittle than petroleum-based polymer resins. Another benefit of being able to provide relatively thick (e.g., at least about 0.15 inch) panel structures without inducing crystallization haze and clouding is the ability to increase impact resistance. The biopolymer panels according to the present invention are thus able to provide clarity and/or translucency for glazing applications while simultaneously providing sufficient impact resistance.

Impact resistance of various biopolymer laminated panels was tested in comparison to traditional PETG and PMMA (petroleum-based polymers) sheets via ASTM D 5420 "Standard Method for Impact Resistance of a Flat, Rigid Plastic Specimen by Means of a Striker Impacted by a Falling Weight" with a Gardner Impact Tester. In this test, the specimen to be tested rests on a base plate over an opening of a specified diameter. An "impactor" sits on the top of the test sample with a nose of a specified radius in contact with the center of the test sample. A weight is raised inside a guide tube to a predetermined height. When released, the weight strikes the impactor, forcing the nose of the impactor into the test sample. The drop energy, and test results (pass or fail) are recorded for each test.

The PETG used in this test was commercial VIVAK 0.03 inch thickness extruded PETG sheet obtained from Sheffield Plastics. The PMMA used in this test was commercial OPTIX 0.06 inch and 0.17 inch thickness extruded PMMA sheet from Plaskolite, Inc. PETG and PMMA are used in comparison as they are known and accepted transparent materials that are often used in plastic glazing and lighting applications. For the biopolymer material, clear extruded SPARTECH REJUVEN8 (99% NATUREWORKS PLA) at 0.03 inch thickness from Spartech Plastics was used.

A second set of laminated biopolymer samples were prepared from clear SPARTECH REJUVEN8 (99% NATUREWORKS PLA) material. Again, this particular sample set was comprised of 6 layers of 0.03 inch PLA laminated in the same manner as described above relative to the flammability test. The resulting laminated panel was 0.16 inch in total thickness, did not crystallize and had excellent lamination integrity.

All samples were cut to 3 inch×4 inch sample sizes and tested in accordance with ASTM D 5420. The impact energy is the highest energy recorded before a material demonstrates failure (e.g., puncture, cracking or surface yield) upon impact. In the case of substantial materials where failure is unlikely to occur, the impact energy is recorded at the top end of the device. The results of the testing are recorded in Table III below:

TABLE III

| ASTM D 5420 Impact Testing | | |
|---|---|---|
| Sample | Force (in-lbs) | Result |
| 0.03 inch PETG | 20 | Pass |
| 0.03 inch PETG | 40 | Pass |
| 0.03 inch PETG | 60 | Pass |
| 0.03 inch PETG | 120 | Pass |
| 0.03 inch PLA | 2 | Fail |
| 0.03 inch PLA | 8 | Fail |
| 0.03 inch PLA | 20 | Fail |
| 0.03 inch PLA | 40 | Fail |
| 0.06 inch PMMA | 2 | Fail |
| 0.06 inch PMMA | 8 | Fail |
| 0.06 inch PMMA | 20 | Fail |
| 0.16 inch PLA | 2 | Pass |
| 0.16 inch PLA | 4 | Pass |

TABLE III-continued

| ASTM D 5420 Impact Testing | | |
|---|---|---|
| Sample | Force (in-lbs) | Result |
| 0.16 inch PLA | 6 | Pass |
| 0.16 inch PLA | 7 | Fail |
| 0.16 inch PLA | 8 | Fail |
| 0.16 inch PLA | 16 | Fail |
| 0.17 inch PMMA | 2 | Pass |
| 0.17 inch PMMA | 4 | Pass |
| 0.17 inch PMMA | 5 | Fail |
| 0.17 inch PMMA | 6 | Fail |
| 0.17 inch PMMA | 8 | Fail |
| 0.17 inch PMMA | 20 | fail |

The PETG impact resistance was the greatest of all, exceeding the impact limitations of the testing apparatus. However, the PMMA sheet, which is also a commonly used material in such panels, does not demonstrate passing results in a thickness of 0.06 inch, even at impact forces as little as 2 in-lbs. The 0.17 inch PMMA sheet shows better impact resistance, but fails at 5 in-lbs. Similarly, at thin gauge, the 0.03 inch PLA does not provide any significant impact resistance, even at the lowest impact threshold (2 in-lbs) on the testing apparatus. However, once laminated to provide a thicker sample, which is possible with excellent bonding strength, without inducing any significant crystallization clouding or hazing, and without inducing thermal degradation, the 0.16 inch PLA sample provides an impact resistance up to 6 in-lbs. This result was 50% more than the 4 in-lbs impact resistance provided by the PMMA specimen that was 0.01 inch (6%) thicker.

Accordingly, laminate structures and panels made in accordance with the present disclosure advantageously are able to provide biopolymer based unitary lightweight panels exhibiting qualities of optical clarity with increased thickness, and that may include embedded decorative objects, interlayers, and surface finishes, as desired. The biopolymer resin panels prepared in accordance with implementations of the present invention can be configured to offer desired properties for virtually any intended application, particularly those related to architectural or building panels. For example, such biopolymer panels can be configured to have adequate thickness, impact resistance, good optical characteristics including clarity, and flammability resistance to allow their use as a replacement for petroleum-based polymer panels. The impact resistance and flammability resistance is particularly improved as compared to commercially available thin-gauge biopolymer sheets. In addition, biopolymer panels constructed in accordance with implementations of the present invention are no more difficult to fabricate and machine with basic fabrication tools as compared to petroleum-based polymer panels.

Furthermore, the biopolymer panels can be easily manipulated to control surface and light transmitting and diffusing qualities with textured finishes. In addition, such panels may be provided in various shapes, including curved configurations. The temperatures and pressures applied for prescribed durations as described herein advantageously do not trigger natural degradation processes and/or induce crystallization clouding or hazing, which would render the panels aesthetically undesirable. As such, panels made in accordance with implementations of the present invention can be used for both aesthetic and structural purposes in a building and/or architectural design environment while offering the life-cycle benefit of being produced from renewable feedstock materials and being biodegradable and/or compostable at the end of their useful life.

As used in this specification and the appended claims, the singular forms "a," "an" and "the" include plural referents unless the context clearly dictates otherwise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A bio-based polymer panel having multiple laminated layers with a combined thickness of at least about 0.15 inches, comprising:
    a first biopolymer resin sheet comprising a biopolymer resin that is not derived from petroleum-based materials;
    at least a second biopolymer resin sheet comprising the same biopolymer resin, the first and at least a second sheet having been laminated together below the melting point of the biopolymer resin without intervening adhesives, so that the first and at least a second sheets comprise a single unitary panel with multiple, laminated resin sheet layers;
    wherein each of the laminated resin sheets in the panel has been heated past its respective glass transition temperature without reaching the melting point, and rapidly quenched, such that the laminated resin sheets of the bio-based polymer panel resist delamination, and such that the bio-based polymer panel exhibits substantially no clouding resulting from crystallization therein.

2. The bio-based polymer panel as recited in claim 1, wherein each resin sheet has a thickness of no more than about 0.06 inch.

3. The bio-based polymer panel as recited in claim 2, wherein each resin sheet exhibits a flame burn rate of more than 63.3 mm/min and the panel exhibits a flame propagation rate of less than 63.3 mm/min such that each resin sheet individually does not conform to minimum burn rate criteria for light transmitting plastics as established by the international building code, but the panel does conform to minimum burn rate criteria for light transmitting plastics as established by the international building code.

4. The bio-based polymer panel as recited in claim 1, further comprising a surface finish on one or more outer faces of the panel.

5. The bio-based polymer panel as recited in claim 1, further comprising an interlayer embedded between the resin sheets of the panel.

6. The bio-based polymer panel as recited in claim 5, wherein the interlayer embedded between the resin sheets comprises a botanical structure.

7. The bio-based polymer panel as recited in claim 5, wherein the interlayer embedded between the resin sheets alters the light transmission or light diffusion characteristics of the panel.

8. The bio-based polymer panel as recited in claim 1, wherein the laminated resin sheets provide an impact resistance greater than 2 in-lbs, and up to 6 in-lbs.

9. The bio-based polymer panel as recited in claim 1, wherein the biopolymer resin sheets comprise a biopolymer selected from the group consisting of polyhydroxyalkonates, polylactic acid, poly-3-hydroxybutyrate, poly-trimethylene terephthalate, cellulose acetate, cellulose acetate butyrate, cellulose acetate propionate, and copolymers thereof.

10. The bio-based polymer panel as recited in claim 1, wherein the biopolymer resin sheets comprise a biopolymer selected from the group consisting of polylactic acid, cellulose acetate, and copolymers thereof.

11. A bio-based polymer panel having multiple laminated layers with a combined thickness of at least about 0.15 inches, comprising:
    a first biopolymer resin sheet consisting of a first biopolymer resin that is not derived from petroleum-based materials, the first biopolymer resin having a first glass transition temperature and a first melting point;
    at least a second biopolymer resin sheet consisting of a second biopolymer resin that is not derived from petroleum-based materials, the second biopolymer resin having a second glass transition temperature and a second melting point, both of which being respectively below the first glass transition temperature and second melting point;
    wherein the first and at least a second sheet are thermally fused together below the second melting point over a first time interval to form a single panel with multiple, resin sheet layers that resist delamination;
    wherein the first and at least a second sheet are quenched over a second time interval that is about the same as the first time interval, such that the bio-based polymer panel is substantially devoid of clouding or crystallization therein, having the same level of clouding or crystallization as the first biopolymer resin sheet and at least the second biopolymer resin sheet before fusion.

12. The bio-based polymer panel as recited in claim 11, wherein:
    the first and second biopolymer sheets have individually-measured burn rates in excess of 63.6 millimeters per minute as measured in the ASTM D635 Standard Test Method for Rate of Burning and/or Extent and Time of Burning of Plastics in a Horizontal Position; and
    the first and second biopolymer sheets, when thermally fused, provide the bio-based polymer panel with a lower burn rate of less than 63.6 millimeters per minute as measured in the ASTM D635 Standard Test Method for Rate of Burning and/or Extent and Time of Burning of Plastics in a Horizontal Position.

13. The bio-based polymer panel as recited in claim 12, wherein:
    the first and second biopolymer sheets have individually-measured burn rates of about 75 millimeters per minute as measured in the ASTM D635 Standard Test Method for Rate of Burning and/or Extent and Time of Burning of Plastics in a Horizontal Position; and
    the first and second biopolymer sheets, when thermally fused, provide the bio-based polymer panel with a burn rate of less than 25 millimeters per minute as measured in the ASTM D635 Standard Test Method for Rate of Burning and/or Extent and Time of Burning of Plastics in a Horizontal Position.

14. The bio-based polymer panel as recited in claim 12, wherein:
    the first and second biopolymer sheets have individually-measured burn rates do not conform to the acceptable standard as specified in the ASTM D635 Standard Test Method for Rate of Burning and/or Extent and Time of Burning of Plastics in a Horizontal Position; and
    the first and second biopolymer sheets, when thermally fused, provide the bio-based polymer panel with a burn rate that conforms to the acceptable standard as specified in the ASTM D635 Standard Test Method for Rate of Burning and/or Extent and Time of Burning of Plastics in a Horizontal Position.

15. The bio-based polymer panel as recited in 11, wherein each resin sheet has a thickness of no more than about 0.06 inch.

16. The bio-based polymer panel as recited in claim 15, wherein each resin sheet exhibits a flame burn rate of more than 63.3 mm/min and the panel exhibits a flame propagation rate of less than 63.3 mm/min such that each resin sheet individually does not conform to minimum burn rate criteria for light transmitting plastics as established by the international building code, but the panel does conform to minimum burn rate criteria for light transmitting plastics as established by the international building code.

17. The bio-based polymer panel as recited in 11, further comprising a surface finish on one or more outer faces of the panel.

18. The bio-based polymer panel as recited in 11, further comprising an interlayer embedded between the resin sheets of the panel.

19. The bio-based polymer panel as recited in claim 18, wherein the interlayer embedded between the resin sheets comprises a botanical structure.

20. The bio-based polymer panel as recited in claim 18, wherein the interlayer embedded between the resin sheets alters the light transmission or light diffusion characteristics of the panel.

21. The bio-based polymer panel as recited in 11, wherein the laminated resin sheets are laminated together to form a single unitary panel exhibiting substantially complete thermal fusion of the biopolymer resin sheets together.

22. The bio-based polymer panel as recited in 11, wherein the biopolymer resin sheets comprise a biopolymer selected from the group consisting of polyhydroxyalkonates, polylactic acid, poly-3-hydroxybutyrate, poly-trimethylene terephthalate, cellulose acetate, cellulose acetate butyrate, cellulose acetate propionate, and copolymers thereof.

23. The bio-based polymer panel as recited in 11, wherein the second time interval is less than about 20 minutes.

24. The bio-based polymer panel as recited in 11, wherein the second time interval is between about 10 and about 15 minutes.

* * * * *

UNITED STATES PATENT AND TRADEMARK OFFICE
CERTIFICATE OF CORRECTION

| | | |
|---|---|---|
| PATENT NO. | : 9,186,868 B2 | Page 1 of 1 |
| APPLICATION NO. | : 13/609073 | |
| DATED | : November 17, 2015 | |
| INVENTOR(S) | : Moore et al. | |

It is certified that error appears in the above-identified patent and that said Letters Patent is hereby corrected as shown below:

In the specification,

<u>Column 2</u>
Line 13, change "CO2" to --$CO_2$--

<u>Column 6</u>
Line 5, change "II. Exemplary" to --I. Exemplary--

Signed and Sealed this
Twenty-sixth Day of April, 2016

Michelle K. Lee
*Director of the United States Patent and Trademark Office*